Aug. 2, 1927.
M. V. OLIVER
1,637,834
SEED PLANTER
Filed Oct. 2, 1925
2 Sheets-Sheet 2
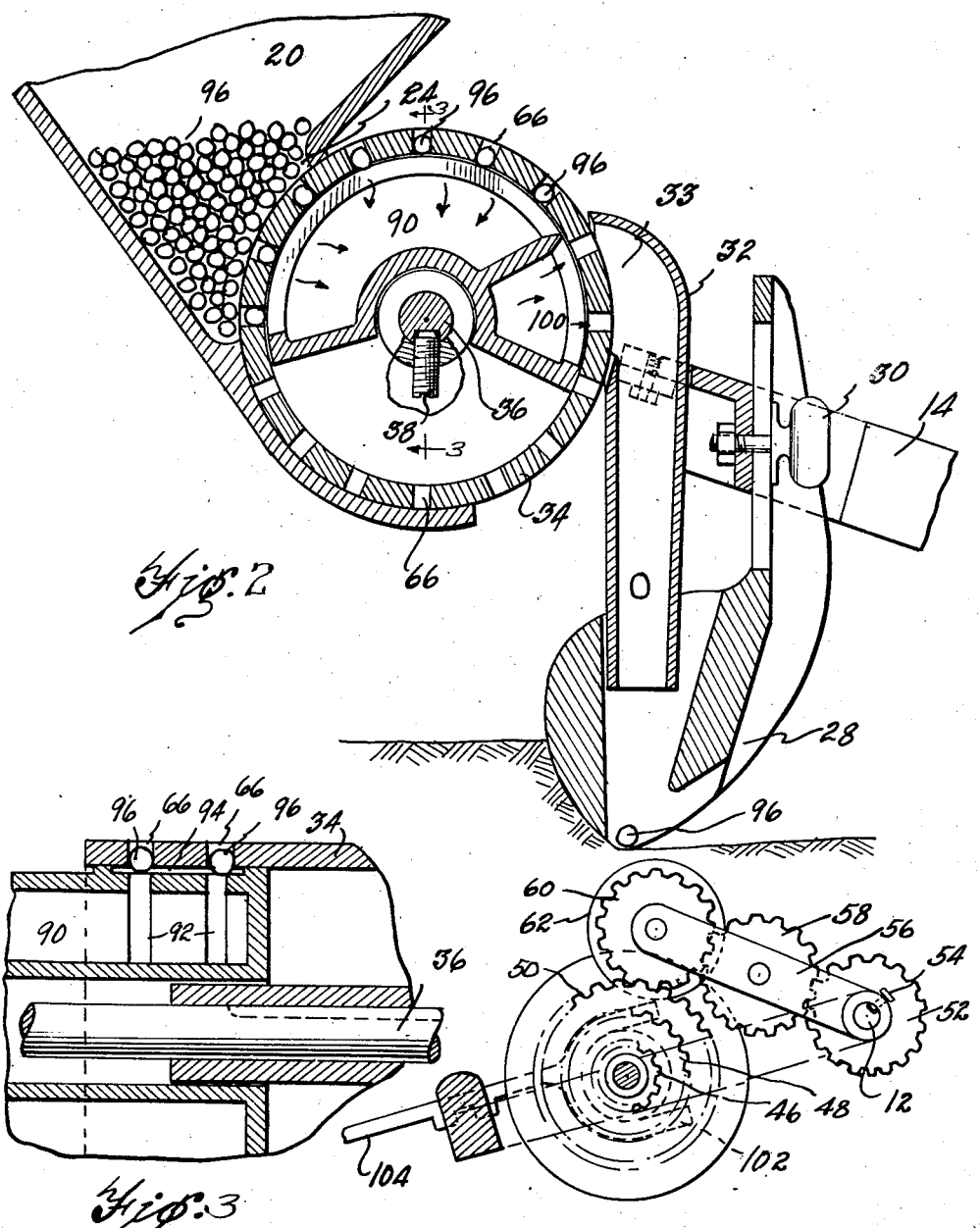
INVENTOR.
MELFORT V. OLIVER
BY Parker & Burton
ATTORNEY.

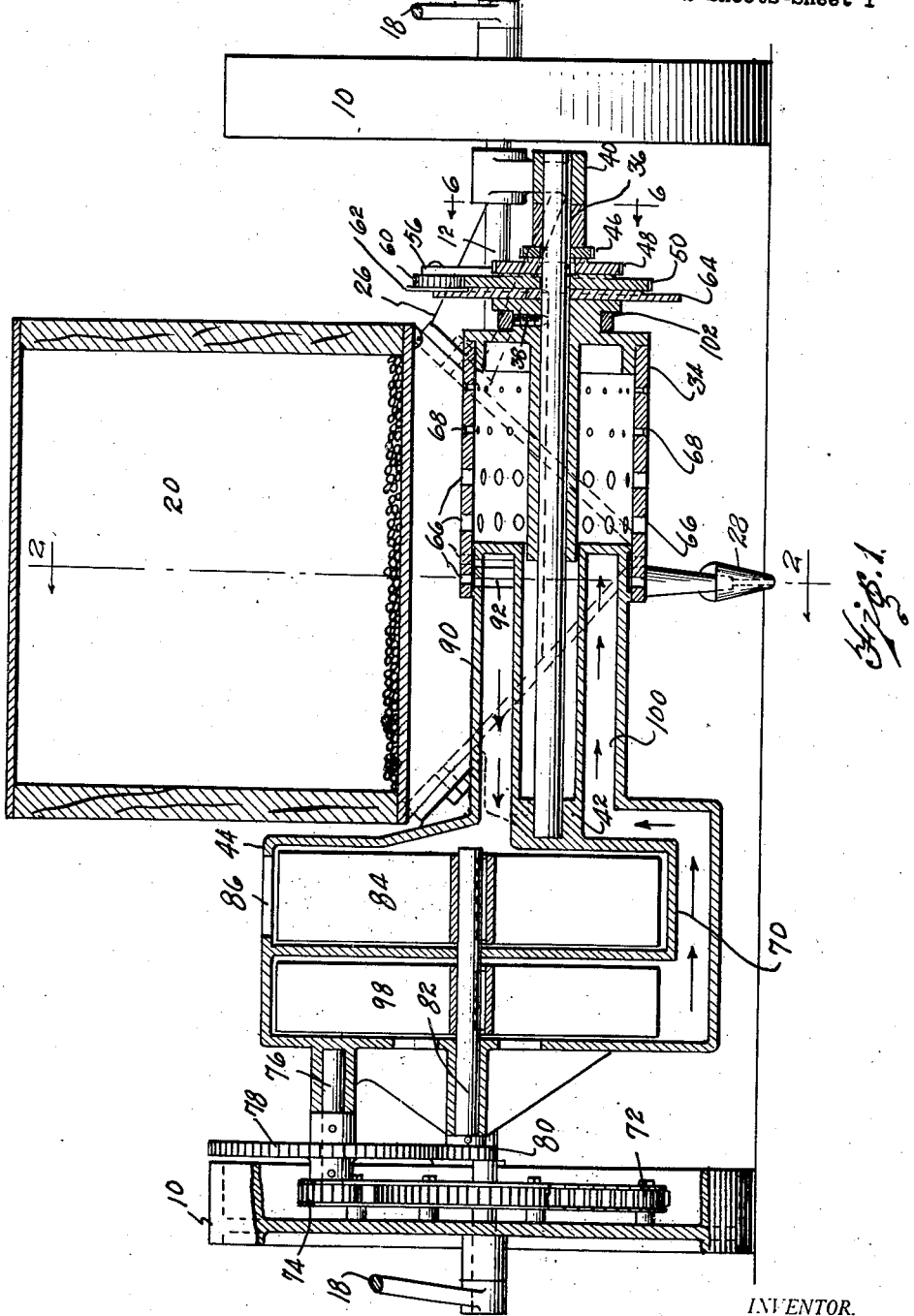

Patented Aug. 2, 1927.

1,637,834

UNITED STATES PATENT OFFICE.

MELFORT V. OLIVER, OF DETROIT, MICHIGAN.

SEED PLANTER.

Application filed October 2, 1925. Serial No. 59,988.

My invention relates to improvements in seed planters.

The object is to provide a seed planter or grain drill adapted to positively and efficiently deposit the desired number of seeds at regular intervals and is here illustrated in a seed drill of the hand power type such as designed for use in connection with gardens, but the invention is capable of adaptation to seed drills of larger size.

An important object is the provision in a drill of the character described of suction mechanism adapted to act upon a distributor which receives the seeds from the hopper and delivers them to the seed spout to retain the seeds thereon during their travel from the hopper to the seed spout, and of air blast mechanism adapted to act upon the distributor at a determined point in its travel to eject the seeds carried by it into the seed spout.

A meritorious advantage is the employment of suction mechanism and air blast mechanism connected with the traction wheels which support the seeder for movement to be driven thereby, and a further meritorious advantage is the employment in my improved seeder of a hollow cylindrical distributor having a plurality of seed pockets on its periphery which communicate with its interior and are so positioned as to receive seeds from the seed receptacle and deliver them to a seed spout, which distributor is mounted so as to be rotatably driven as the seeder is moved forwardly.

A feature of importance consists in the provision of suction mechanism and air blast mechanism which terminates within the hollow cylindrical distributor and communicate with certain portions of its inner periphery to retain the seeds thereon during rotatable travel of the distributor from the receptacle to the seed spout and to eject the seeds therefrom when opposite the seed spout.

My hollow cylindrical distributor is provided with a series of seed pockets of different sizes arranged in spaced-apart relationship endwise the distributor. The distributor is adjustable endwise to place pockets of different size in position to receive seed from the seed receptacle.

Various other important and meritorious features and advantages will more fully appear from the following description, appended claims and accompanying drawings, in which:

Fig. 1 is a cross-sectional view.

Fig. 2 is a cross-sectional view taken on line 2—2, Fig. 1.

Fig. 3 is a fragmentary sectional view taken on line 3—3, Fig. 2.

Fig. 4 is a sectional view taken on line 4—4, Fig. 1.

In the drawings I have shown my invention as embodied in a relatively small hand drill supported by traction wheels 10 mounted upon an axle 12 which rotates with the wheels and having a frame 14 which extends rearwardly to a ground roller. Mounted upon the frame is a hopper or seed receptacle 20 having a suitable cover 22 and terminating in a discharge opening 24. This hopper is supported by braces 26 which extend from the frame. There is a plow or colter 28 secured to the frame 14 for vertical adjustment by a set screw 30 so that it may be set to project at different depths in the ground and a seed spout 32 which projects into the hollow interior of the colter to deposit seeds therein.

I provide a hollow cylindrical seed distributor 34 which is splined upon a shaft 36 by a key 38 for longitudinal adjustment thereover. This shaft has a bearing in the frame at 40 at one end and at the opposite end a bearing in a boss 42 formed on the suction casing 44 hereinafter described. This distributor is rotatably driven from the axle 12 by means of a train of gears illustrated particularly in Figs. 1 and 4. The distributor shaft 36 carries a set of gears indicated as 46, 48 and 50 of different size, each of which is adapted to mesh with one gear of the train illustrated in Fig. 4 to drive the distributor at different rates of speed.

The gear train illustrated in Fig. 4 consists of a gear 52 splined on shaft 12 by a key 54. A plate 56 is provided to which is secured the gears 58 and 60. Gear 58 meshes with gear 52 to be driven thereby and gear 60 meshes with gear 58 to be driven thereby. Gear 60 has a side plate 62 which is of greater diameter and seats alongside of either gear 46, 48 or 50 which it engages to hold the same in mesh therewith. A plate 64 is placed alongside of the gear 50 spaced therefrom so as to permit the plate 62 to be received between the plate 64 and the gear 50 and there is an annular recess separating gears 48 and 50 and gears 46 and 48 within which the plate 62 may be received.

It will be understood that the entire train of gears illustrated in Fig. 4 may be moved lengthwise the shaft 12 as gear 52 is keyed thereto, to permit the gear 60 to be engaged with either of the gears 46, 48 or 50. This provides a change-speed drive for the distributor.

The distributor is provided with a series of seed pockets arranged circumferentially thereabout, as shown in Figs. 1, 2 and 3. These pockets are indicated as 66. As shown in Fig. 1, there are a plurality of these circumferential series which are of different size. A series of different sizes is spaced longitudinally the distributor. This is for the purpose of accommodating seeds of different size. I have shown pockets 68 which are countersunk to receive seeds of relatively small size. It will be seen that these pockets have an opening into the interior of the distributor. The distributor is so mounted as to close the opening 24 from the hopper 20 so as to receive seeds therefrom within its pockets as they pass over such opening during the rotation of the distributor and to travel in a clockwise direction to bring these pockets into position before the opening 33 in the seed spout 32 to discharge thereinto.

I provide suitable suction mechanism to cause the seeds collected in the pockets of the distributor to be retained therein during the rotation of the distributor and suitable air blast mechanism to eject the seeds from said pockets which is driven by the traction wheels 10 and consists of a large casing 44 carried by a frame 14 and the axle 12, which has a separate independent compartment 70 to provide a suction compartment and an air blast compartment.

One of the traction wheels 10 carries a ring gear 72 which drives a small gear 74 mounted upon a stub shaft 76, which shaft also carries a large gear 78 that drives a small gear 80 mounted upon a shaft 82 which extends through the casing 44, thereby speeding up to a high degree the rotation of the shaft 82. Upon the shaft 82 is mounted a suction fan 84. This casing within which the suction fan is mounted has exhaust openings 86 and an extension which terminates in a tubular portion 90 that projects into the hollow cylindrical distributor 34. This tubular portion 90 is in the form of a segment which abuts the inner surface of the wall of the receptacle distributor from where it first registers with the opening 24 of the hopper to where it first engages with the opening 33 of the seed spout, and this tubular extension of the section casing is provided with radial slots 92 which terminate in a longitudinal recess 94 on the surface of the tubular extension, which recess registers with the opening 66 through the distributor so that suction is created to hold the seeds 96 within the pockets 66 during the rotation of the distributor from the point where it receives the seeds from the hopper to where they are brought into position to be deposited into the seed spout. The slots are of such a limited size and the registration with the seed pockets is of such a character that the seeds will not be drawn into the suction chamber.

I provide air blast mechanism to eject the seeds from the distributor. There is a fan 98 mounted upon the shaft 82 which creates a forced air blast through the tubular extension 100 which terminates within the distributor along that portion of its wall which is passing over the open mouth of the seed spout so as to direct a blast of air against the seed pockets as they pass over the seeds to eject the seeds into the spout. In order to move the distributor lengthwise to bring different seed pockets into position to receive seeds from the hopper the hub of the distributor is provided with an annular channel within which is mounted a shifter fork 102 having a handle 104 which is adapted to be dropped into recesses 106 along the frame to hold the distributor at adjusted positions.

What I claim is:

1. In a seed planter, a seed receptacle, a rotatably supported hollow cylindrical distributor having seed pockets on its periphery communicating with its interior and adapted to receive seeds from the receptacle, suction creating mechanism terminating in a tubular portion extending into said distributor and open to the seed pocket openings in the distributor, and air blast creating mechanism terminating within said distributor to direct an air blast upon the seed pockets to eject the seeds therefrom, said distributor provided with a plurality of longitudinally spaced-apart seed pockets of different size and being movable lengthwise to bring pockets of different size into position to receive seed from said receptacle.

2. In a seed planter, a seed receptacle having a discharge outlet, a rotatably supported axially adjustable hollow cylindrical distributor provided with a plurality of longitudinally spaced apart circumferentially arranged series of different size seed receiving apertures through its wall, an air suction device and an air blast device each having a tubular portion extending axially into said cylindrical distributor, each tubular portion provided with a radial slot adapted upon axial adjustment of the distributor to be brought into registration with different series of seed receiving apertures of the distributor, each of said slots being of a width less than the diameter of said seed receiving apertures, said distributor being longitudinally slidably mounted upon said tubular portions for adjustment to bring the successive series of seed apertures into registration with the slots thereof.

3. In a seed planter, a seed receptacle having an outlet, a rotatably supported hollow cylindrical seed distributor provided with a plurality of longitudinally spaced apart circumferentially arranged series of different size seed receiving apertures through its wall, said distributor splined upon a driving shaft to rotate therewith and having a permitted axial movement thereover, a tubular member extending into the distributor and over which the same rolls during its rotation, said tubular member divided into two longitudinal compartments, an air suction device communicating with one compartment of said tubular member and an air blast device communicating with the other compartment of said tubular member, each compartment of said tubular member provided with an opening adapted upon longitudinal adjustment of said distributor to be brought into registration with different seed openings in said distributor, means for moving said distributor axially with respect to said tubular member and means for rotating said distributor at any position to which it has been axially adjusted.

In testimony whereof, I sign this specification.

MELFORT V. OLIVER.